(12) United States Patent
Hara

(10) Patent No.: US 11,775,055 B2
(45) Date of Patent: Oct. 3, 2023

(54) REHABILITATION SUPPORT APPARATUS, METHOD THEREFOR, AND PROGRAM

(71) Applicant: mediVR, Inc., Osaka (JP)

(72) Inventor: Masahiko Hara, Osaka (JP)

(73) Assignee: mediVR, Inc., Osaka (JP)

(*) Notice: Subject to any disclaimer, the term of this patent is extended or adjusted under 35 U.S.C. 154(b) by 505 days.

(21) Appl. No.: 17/044,671

(22) PCT Filed: May 20, 2020

(86) PCT No.: PCT/JP2020/019939
§ 371 (c)(1),
(2) Date: Oct. 1, 2020

(87) PCT Pub. No.: WO2021/070411
PCT Pub. Date: Apr. 15, 2021

(65) Prior Publication Data
US 2023/0108954 A1    Apr. 6, 2023

(30) Foreign Application Priority Data
Oct. 7, 2019    (JP) .................................. 2019-184295

(51) Int. Cl.
*G06F 3/01*    (2006.01)
*A61H 1/02*    (2006.01)
(Continued)

(52) U.S. Cl.
CPC ............... *G06F 3/012* (2013.01); *A61H 1/02* (2013.01); *G02B 27/0093* (2013.01);
(Continued)

(58) Field of Classification Search
CPC ... G06F 3/012; A61H 1/02; A61H 2201/1604; A61H 2201/165; A61H 2201/5043;
(Continued)

(56) References Cited

U.S. PATENT DOCUMENTS 6,084,587 A    7/2000 Tarr et al.
9,072,968 B2   7/2015 Sakai et al.
(Continued)

FOREIGN PATENT DOCUMENTS

CN    102989175 A    3/2013
CN    103480154 A    1/2014
(Continued)

OTHER PUBLICATIONS

Extended European Search Report dated May 11, 2021 for Application No. EP 20780548.2.
(Continued)

*Primary Examiner* — Dmitriy Bolotin
(74) *Attorney, Agent, or Firm* — Sheppard Mullin Richter & Hampton LLP

(57) ABSTRACT

An apparatus for supporting rehabilitation of a user includes a detector that detects a direction of a head of the user wearing a head mounted display, and a display controller that generates, in a virtual space, a rehabilitation target object to be visually recognized by the user and displays the target object on the head mounted display in accordance with the direction of the head of the user detected by the detector. To avoid risk that the user interferes with an object in a real space, the display controller further controls display of the head mounted display.

9 Claims, 6 Drawing Sheets

(51) Int. Cl.
*G02B 27/00* (2006.01)
*G02B 27/01* (2006.01)

(52) U.S. Cl.
CPC ....... *G02B 27/0101* (2013.01); *G02B 27/017* (2013.01); *G02B 27/0179* (2013.01); *A61H 2201/1604* (2013.01); *A61H 2201/165* (2013.01); *A61H 2201/5043* (2013.01); *G02B 2027/014* (2013.01); *G02B 2027/0138* (2013.01); *G02B 2027/0187* (2013.01)

(58) Field of Classification Search
CPC ............ G02B 27/0093; G02B 27/0101; G02B 27/017; G02B 27/0179; G02B 2027/0138; G02B 2027/014; G02B 2027/0187
See application file for complete search history.

(56) References Cited

U.S. PATENT DOCUMENTS

| | | | |
|---|---|---|---|
| 9,081,177 B2 | 7/2015 | Wong et al. | |
| 9,599,818 B2 | 3/2017 | Yamagishi et al. | |
| 9,729,864 B2 | 8/2017 | Stafford | |
| 10,438,399 B2 | 10/2019 | Tsukahara et al. | |
| 10,496,156 B2 | 12/2019 | Tilton et al. | |
| 10,591,987 B2 | 3/2020 | Pan | |
| 2011/0009241 A1* | 1/2011 | Lane | G06F 3/011 482/8 |
| 2014/0188009 A1* | 7/2014 | Lange | A61B 5/1127 600/595 |
| 2015/0045994 A1 | 2/2015 | Krishna et al. | |
| 2016/0026253 A1* | 1/2016 | Bradski | H04N 13/128 345/8 |
| 2016/0033770 A1* | 2/2016 | Fujimaki | H04N 13/344 345/8 |
| 2018/0032230 A1* | 2/2018 | Inomata | G06F 3/014 |
| 2019/0033989 A1* | 1/2019 | Wang | G06T 19/006 |
| 2019/0049977 A1* | 2/2019 | Dean | G05D 1/0225 |
| 2019/0094955 A1* | 3/2019 | Zuber | G06F 3/016 |
| 2019/0094981 A1* | 3/2019 | Bradski | H04N 21/414 |
| 2019/0247719 A1 | 8/2019 | Hara | |
| 2023/0108954 A1* | 4/2023 | Hara | G02B 27/017 345/156 |

FOREIGN PATENT DOCUMENTS

| | | |
|---|---|---|
| CN | 105705210 A | 6/2016 |
| CN | 107831908 A | 3/2018 |
| CN | 108021227 A | 5/2018 |
| CN | 108700942 A | 10/2018 |
| CN | 108975167 A | 12/2018 |
| CN | 110022835 A | 7/2019 |
| CN | 110291577 A | 9/2019 |
| EP | 3539525 A1 | 9/2019 |
| JP | H09120464 A | 5/1997 |
| JP | 2013257716 A | 12/2013 |
| JP | 2015226967 A | 12/2015 |
| JP | 2016541035 A | 12/2016 |
| JP | 2019076290 A | 5/2019 |
| JP | 2019139424 A | 8/2019 |

OTHER PUBLICATIONS

Espacenet English abstract of JP 2019139424 A.
International Search Report (ISR) and Written Opinion (WO) dated Jul. 7, 2020 for Application No. PCT/JP2020/019939.
Espacenet English abstract of JP 2015228957 A.
Espacenet English abstract of JP 2019076290 A.
Espacenet English abstract of JP 2013257716 A.
Espacenet English abstract of JP 2016541035 A.
First Office Action dated Nov. 18, 2022, in Chinese Patent Application No. 202080002839.2, with an English machine translation thereof, 20 pages.
Notice of Grant of Patent for Invention dated Jul. 26, 2023, in Chinese Patent Application No. 202080002839.2, with an English machine translation thereof, 10 pages.

* cited by examiner

REHABILITATION SUPPORT APPARATUS, METHOD THEREFOR, AND PROGRAM

RELATED APPLICATION

This application is an application under 35 U.S.C. 371 of International Application No. PCT/JP2020/019939 filed on May 20, 2020, the entire contents of which are incorporated herein by reference.

This application claims the benefit of Japanese Patent Application No. 2019-184295 filed on Oct. 7, 2019, which is hereby incorporated by reference herein in its entirety.

TECHNICAL FIELD

The present invention relates to a rehabilitation support apparatus, a method therefor, and a program.

BACKGROUND ART

In the above technical field, patent literature 1 discloses a system 15 configured to support rehabilitation.

CITATION LIST

Patent Literature

Patent literature 1: Japanese Patent Laid-Open No. 2015-228957

SUMMARY OF THE INVENTION

Technical Problem

In the technique described in the above literature, however, it is impossible to avoid risk to a user during rehabilitation. A user who is wearing a head mounted display cannot see surroundings. Hence, for example, if the user hits an object in a real space, he/she cannot brace himself/herself and may get an injury such as sprain at a high possibility.

The present invention enables to provide a technique of solving the above-described problem.

Solution to Problem

One example aspect of the present invention provides a rehabilitation support apparatus for supporting rehabilitation of a user, comprising:

a detector that detects a direction of a head of the user wearing a head mounted display; and a display controller that generates, in a virtual space, a rehabilitation target object to be visually recognized by the user and displays the target object on the head mounted display in accordance with the direction of the head of the user detected by the detector, wherein to avoid risk that the user interferes with an object in a real space, the display controller further controls display of the head mounted display.

Advantageous Effects of Invention

According to the present invention, it is possible to avoid risk to a user during rehabilitation or to his/her circumference.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A rehabilitation support apparatus 100 according to the first example embodiment of the present invention will be described with reference to FIG. 1. The rehabilitation support apparatus 100 is an apparatus that supports and evaluates rehabilitation of a user 130.

Figure 1:
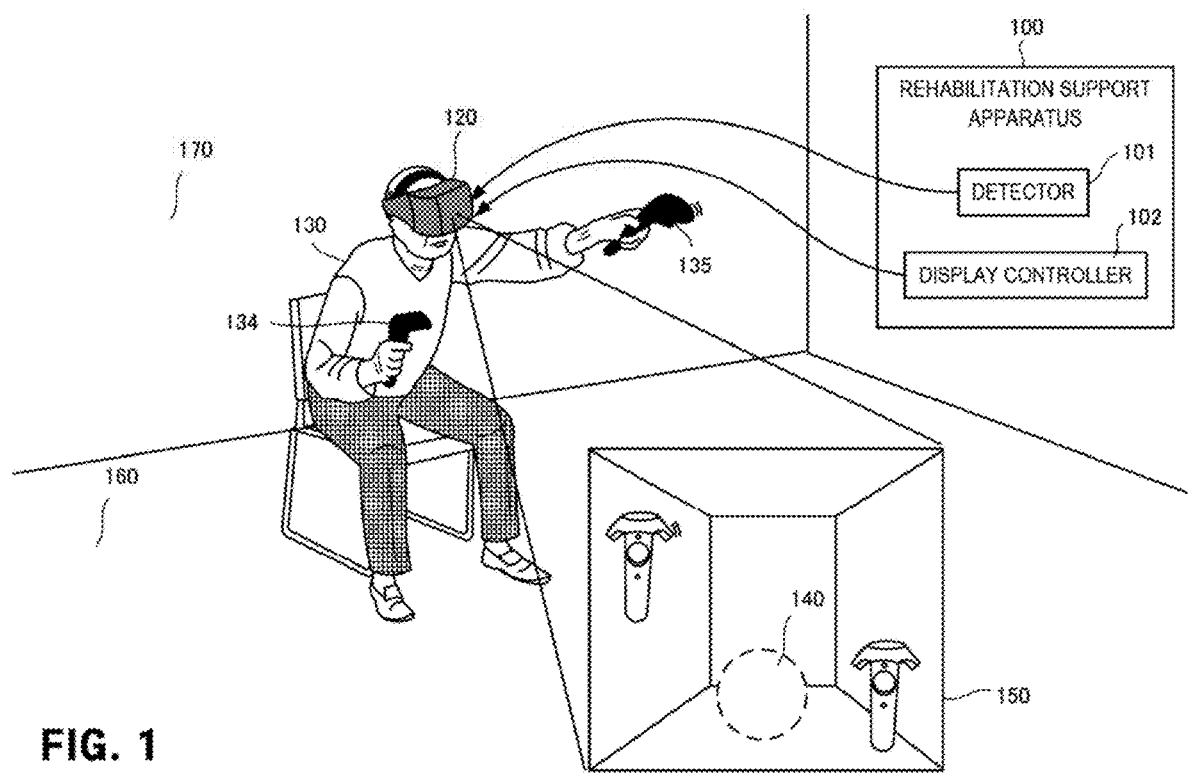
FIG. 1 is a view showing the arrangement of a rehabilitation support apparatus according to the first example embodiment of the present invention.

As shown in FIG. 1, the rehabilitation support apparatus 100 includes a detector 101 and a display controller 102.

The detector 101 detects the direction of the head of the user 130 who wears a head mounted display 120.

The display controller 102 generates, in a virtual space 150, a rehabilitation target object 140 to be visually recognized by the user 130, and displays the target object 140 on the head mounted display 120 in accordance with the direction of the head of the user 130 detected by the detector 101.

Furthermore, to avoid risk that the user 130 interferes with an object (for example, a floor 160 or a wall 170) in the real space, the display controller 102 controls display on the head mounted display 120.

For example, consider a system in which the user 130 touches, by controllers 134 and 135, the object 140 dropping in the virtual space 150, thereby implementing the rehabilitation action of the user 130. In this case, for example, when a program configured to make the object 140 disappear 20 cm above the floor is used, the user can be prevented from hitting the controllers or hands on the floor 160. The number 20 cm is merely an example, as a matter of course, and it may be 25 cm or 30 cm.

Display control performed to avoid risk to the user 130 or to his/her circumference is not limited to control of "making an object disappear within a predetermined range", and various other methods can be considered. Hence, the present invention is not limited to the control. Since the target object disappears 20 cm above the floor, it is possible to prevent risk that the user hits the controller on the floor and gets injured, or falls forward.

Second Example Embodiment

Figure 2:
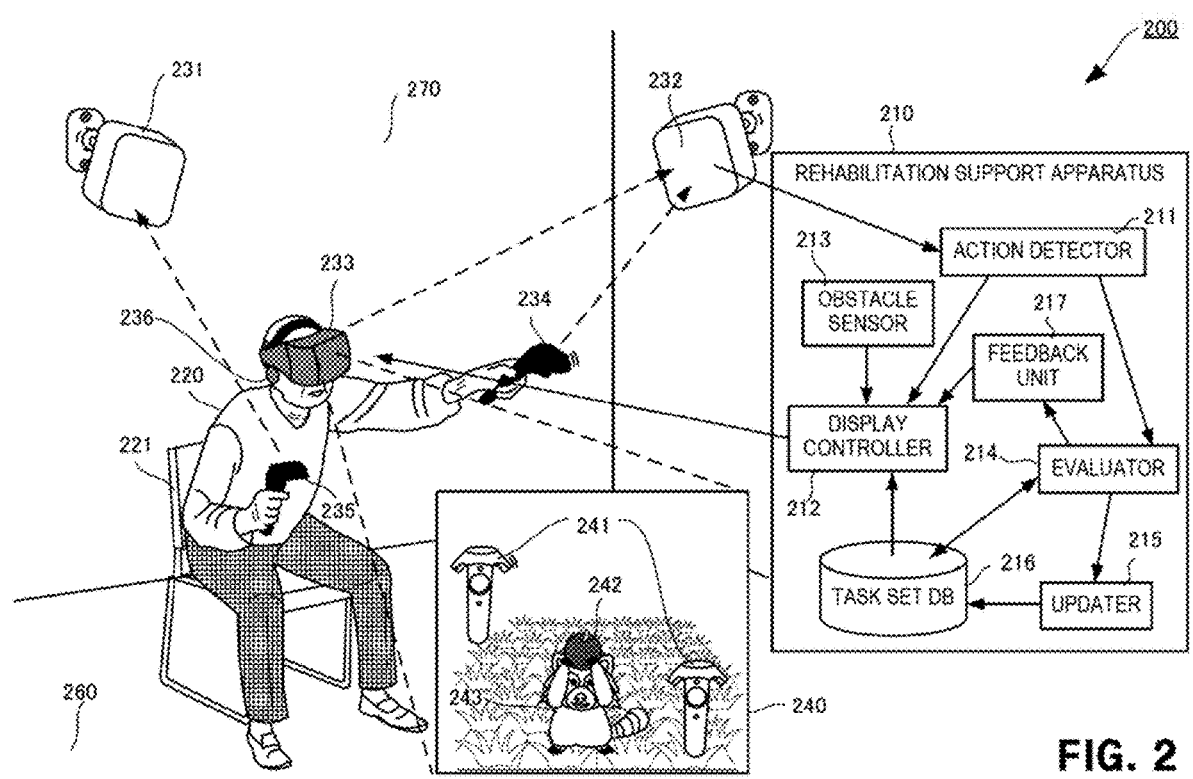
FIG. 2 is a view showing the arrangement of a rehabilitation support apparatus according to the second example embodiment of the present invention.

A rehabilitation supporting system 200 according to the second example embodiment of the present invention will be described with reference to FIG. 2. FIG. 2 is a view for explaining the arrangement of a rehabilitation supporting system 200 according to this example embodiment.

As shown in FIG. 2, the rehabilitation supporting system 200 includes a rehabilitation support apparatus 210, two base stations 231 and 232, a head mounted display 233, and two controllers 234 and 235. A user 220 sitting on a chair 221 inclines or twists the upper half body or stretches the hands in various directions in accordance with display on the head mounted display 233, thereby making a rehabilitation action. In this example embodiment, a description will be made assuming rehabilitation performed while sitting on a chair. However, the present invention is not limited to this. Rehabilitation may be performed while walking or running, or may be performed while lying on a bed, a mattress, or the like. Rehabilitation may be performed while holding a specific posture or state using some tool, or may be performed while walking or running while holding a steady position at any angle or inclination state using a treadmill or another walking support device.

The two base stations 231 and 232 sense the position and motion of the head mounted display 233 and the positions and motions of the controllers 234 and 235, and send these to the rehabilitation support apparatus 210. The rehabilitation support apparatus 210 performs display control of the head mounted display 233 while evaluating the rehabilitation action of the user 220 based on the position and motion of the head mounted display 233 and the positions and motions of the controllers 234 and 235. The head mounted display 233 can be of a non-transmissive type, a video see-through type, or optical see-through type. A headphone speaker 236 is attached to the head mounted display 233, and the rehabilitation support apparatus 210 outputs, from the headphone speaker 236, a voice according to the evaluation result of the rehabilitation action of the user 220. Note that the voice output method is not limited to the headphone speaker, and an external voice output device, a bone conduction earphone, or the like may be used.

In this example embodiment, as an example of a sensor configured to detect the action of the user 220, the controllers 234 and 235 held in the hands of the user 220, and the base stations 231 and 232 have been described. However, the present invention is not limited to this. A camera (including a depth sensor) configured to detect the positions of the hands of the user by image processing, a sensor configured to detect the positions of the hands of the user by a temperature, a wristwatch-type wearable terminal put on an arm of the user, a motion capture device, or the like may be included in the action detector.

The rehabilitation support apparatus 210 includes an action detector 211, a display controller 212, an obstacle sensor 213, an evaluator 214, an updater 215, a task set database 216, and a feedback unit 217.

The action detector 211 acquires, via the base stations 231 and 232, the positions of the controllers 234 and 235 held in the hands of the user 220, and detects the rehabilitation action of the user 220 based on changes in the positions of the hands of the user 220.

The obstacle sensor 213 senses an object that becomes a hindrance to the rehabilitation action of the user 220. For example, the obstacle sensor 213 senses the position of at least one of a floor surface 260 and a wall surface 270, which are obstacles in the real space around the user. The obstacle sensed by the obstacle sensor 213 may be any object, whether static or dynamic, as long as it is an object around the user 220. That is, obstacles are not limited to the floor surface 260 and the wall surface 270, and may be a person, a pet, a desk, a door, a home appliance, an animal, a plant, an insect, a curtain, or may be vapor, a water droplet, ice, flame, and the like.

The display controller 212 generates, in a virtual space, avatar objects 241 that move in accordance with a detected rehabilitation action and a target object 242 representing the target of the rehabilitation action. Other objects (a background object and the like) may be included in the virtual space. The display controller 212 displays, on a display screen 240, the images of the avatar objects 241 and the target object 242 in accordance with the direction and position of the head mounted display 233 detected by the action detector 211.

The images of the avatar objects 241 and the target object 242 are superimposed on the background image. Here, the avatar objects 241 have the same shape as the controllers 234 and 235. However, the shape is not limited to this, and an image in the shape of a human hand, an image expressing another body part, an image in the shape of some tool, or the like may be used. The avatar objects 241 move in the display screen 240 in accordance with the motions of the controllers 234 and 235. The controllers 234 and 235 are provided with buttons and configured to perform various kinds of setting operations.

The display controller 212 moves the target object 242 in the display screen 240 while gradually changing its display position and size. For example, the display controller 212 moves and displays the target object 242 such that it falls downward from above the user 220, or moves and displays the target object 242 such that it approaches the user 220. The moving direction of the target object 242 is not limited to the up-and-down direction but may be a let-and-right direction or an oblique direction. Note that an example in which the target object 242 moves has been described here. However, the present invention is not limited to this, and the target object 242 at rest may be displayed.

The user 220 moves the controllers 234 and 235 to make the avatar objects 241 in the screen approach to the target object 242. If the avatar objects 241 hit the target object 242, the display controller 212 makes the target object 242 disappear. At this time, the feedback unit 217 determines that a target action has been achieved, and displays a message, and simultaneously outputs a voice from the headphone speaker 236, and vibrates the controllers.

The evaluator 214 compares the rehabilitation action detected by the action detector 211 and a target position represented by the target object displayed by the display controller 212, and evaluates the rehabilitation capability of the user 220. More specifically, the evaluation is done by comparing the positions in the three-dimensional virtual space concerning the target object 242 and the avatar objects 241 that move in correspondence with the rehabilitation action detected by the action detector 211. In other words, the evaluator 214 changes the evaluation of the rehabilitation action depending on how close the distance between the target object 242 and a sensor object included in each avatar object 241 (for example, the center of the avatar object 241) has become. For example, if the sensor object contacts the center of the target object 242, high evaluation is given. If the sensor object contacts only the peripheral portion of the center of the target object 242 but not the center, low evaluation is given. If the sensor object does not contact any portion of the target object 242, no evaluation is given. These evaluations by the evaluator 214 are given in synchronism with the feedback of the feedback unit 217.

The feedback unit 217 changes feedback such as a message in accordance with the evaluation of the rehabilitation action via the display controller 212. For example, if the sensor object contacts the center of the target object 242, "excellent" is displayed. If the sensor object contacts only the peripheral portion of the center of the target object 242, "well done" is displayed. For the user who has virtually touched the target object 242 by the avatar object 241, the feedback unit 217 performs feedback for stimulating at least two of five senses almost at the same time as the timing of a touch on the target object 242.

The display controller 212 can make the target object 242 appear at different positions (for example, positions of three stages) in the depth direction. The evaluator 214 gives different points (a high point to a far object, and a low point to a close object).

The task set database 216 stores a plurality of task sets. A task represents one rehabilitation action that the user should make. More specifically, the task set database 216 stores, as information representing one task, information representing the size, position, and speed of a target object that was made to appear and the size of the avatar object at that time.

More specifically, the contents of a task include the sizes of the left and right target objects 242, the sizes of the avatar objects 241 (sensor objects), the failing speed of the target object 242, the position of the target object, and the like. More specifically, on each of the right and left sides, the radius (visual recognition size) of a visual recognition object that makes the target object position easy to see, and the radius (evaluation size) of a target object that reacts with the avatar object 241 can also be set as the contents of a task. That is, a ball with a radius of 20 cm is shown to the user, and evaluation "excellent" is given only when he/she has touched a ball with a radius of 10 cm located at the center of the ball. If the visual recognition size is small, it is difficult for the user to find the target object. If the visual recognition size is large, the user can easily find the target object. If the evaluation size is large, the allowable amount of the deviation of the avatar object 241 is large, and the tolerance to the position deviation rises. If the evaluation size is small, the allowable amount of the deviation of the avatar object 241 is small, and a rehabilitation action can be evaluated more severely. The visual recognition sizes and the evaluation sizes may be made to match.

Parameters in the task set DB including the sensor size of the avatar object 241 (the size of the sensor object) may separately be set on the left and right sides or separately set on a task basis. If the sensor size is large, a task is achieved even if the position of a hand largely deviates from the target object. Hence, the difficulty of the rehabilitation action is low. Conversely, if the sensor size is small, it is necessary to correctly move the hand to the center region of the target object (depending on the evaluation size). Hence, the difficulty of the rehabilitation action is high.

If there is a difference in physical capability between the left and right sides in a case of, for example, mobility impairment caused by the sequelae of cerebral infarction, the sensor size of the avatar object is changed between the left and right sides, thereby performing more effective rehabilitation.

The task set database 216 stores task sets each of which determines the order to provide the plurality of tasks to the user. For example, the task sets may be stored as templates for each hospital, or a history of executed task sets may be stored for each user. The rehabilitation support apparatus 210 may be configured to be communicable with another rehabilitation support apparatus via the Internet. In this case, one task set may be executed by the same user in a plurality of places, or various templates may be shared by a plurality of users in remote sites.

In accordance with a task set read out from the task set database 216, the display controller 212 displays the target object 242 on the display screen 240 and requests an action of virtually touching the target object 242 by the avatar object 241.

The updater 215 updates a target task in accordance with the integrated point. For example, the target task may be updated using a task achieving ratio (target achieving count/task count).

(Risk Avoidance Processing)

To avoid risk that the user 220 interferes with the floor 260 or the wall surface 270, which is an object in the real space, the display controller 212 controls display of the head mounted display 233. More specifically, to avoid hit on the floor surface 260 or the wall surface 270, the display controller 212 displays the target object 242 at a position apart from the floor surface 260 or the wall surface 270 by a predetermined distance or more, but not at a position within the predetermined distance. In the example shown in FIG. 2, an apple that is the target object 242 falls from a tree. When the target object reaches a position apart from the floor surface 260 by a predetermined distance (for example, 20 cm), a raccoon 243 grabs it and stops so the target object does not fall beyond the height. After that, the raccoon 243 brings the apple that is the target object 242 to the nest.

Figure 3A:
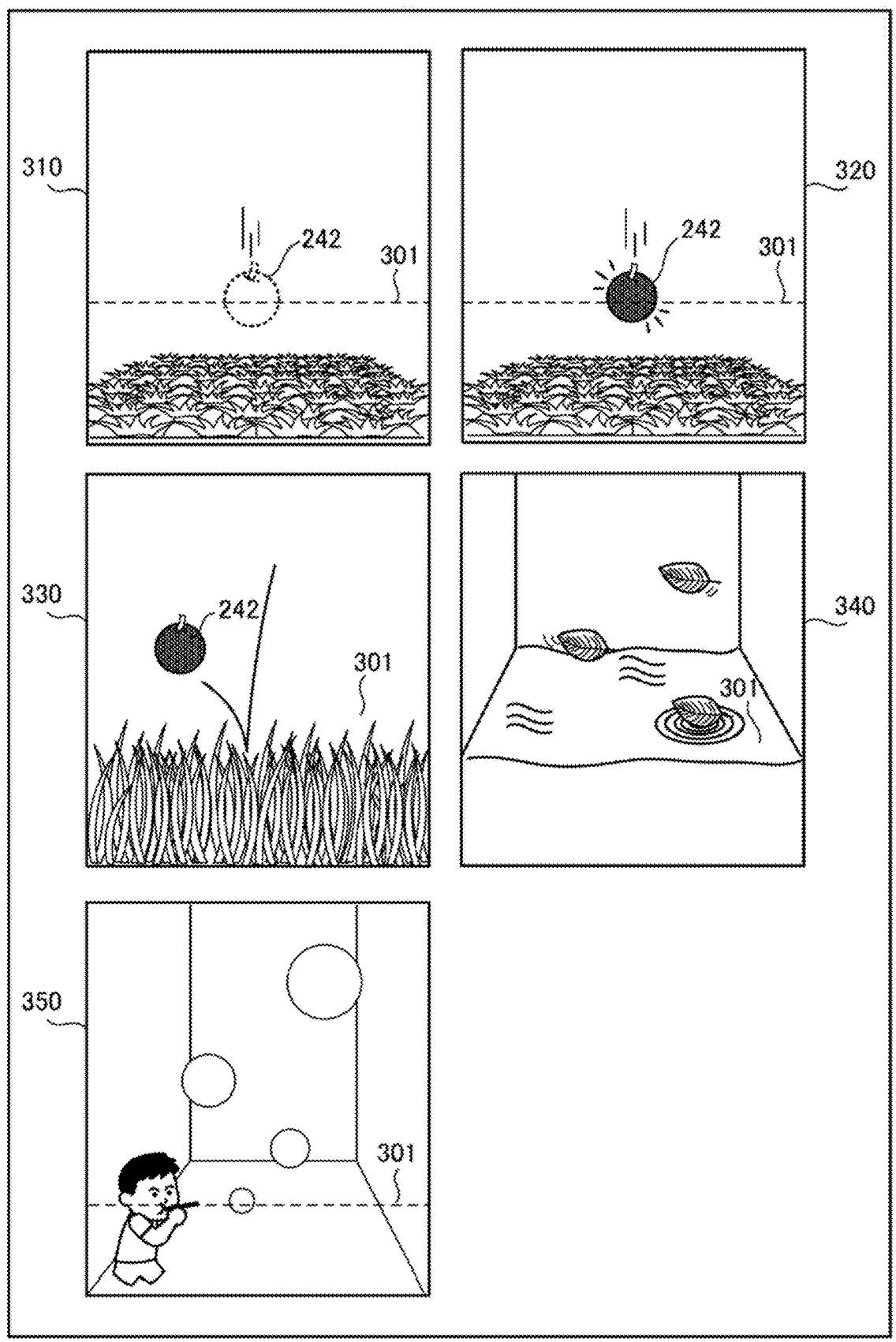
FIG. 3A is a view showing examples of display control of the rehabilitation support apparatus according to the second example embodiment of the present invention.

FIG. 3A shows various examples of display to avoid risk that the user 220 interferes with the floor 260 or the wall surface 270, which is an object in the real space. An example 310 shows an example in which the target object 242 disappears at a position 301 apart from the floor surface 260 by a predetermined distance (for example, 20 cm). An example 320 shows an example in which the target object 242 stops at the position 301 apart from the floor surface 260 by the predetermined distance. An example 330 shows an example in which the target object 242 rebounds upward at the position 301 apart from the floor surface 260 by the predetermined distance. An example 340 shows an example in which a water surface is displayed at the position 301 apart from the floor surface 260 by the predetermined distance, and a leaf as the target object 242 floats on the water surface. An example 350 shows an example in which a child is displayed at the position 301 apart from the floor surface 260 by the predetermined distance, and a soap bubble as the target object 242 floats and moves upward from the child. Alternatively, a soap bubble as the target object 242 may turn at a position 20 cm above the floor surface and rise, and disappear at a certain height. Alternatively, a mole sticking the face out of the ground surface, as in a whack-a-mole game, may be set as the target object. A fish jumping out the sea may be set to the target object. A missile launched upward from a launcher may be set to the target object. A balloon released from a child's hand and rising upward may be set to the target object. In this case, display control may be performed such that balloons as many as the number of failures are caught on a tree and cannot rise upward too much. If a rehabilitation action cannot sufficiently be performed in a direction due to a wall in the real space around the user, the target object may not be displayed in the direction, or the display may be changed in accordance with the distance to the wall.

Figure 3B:
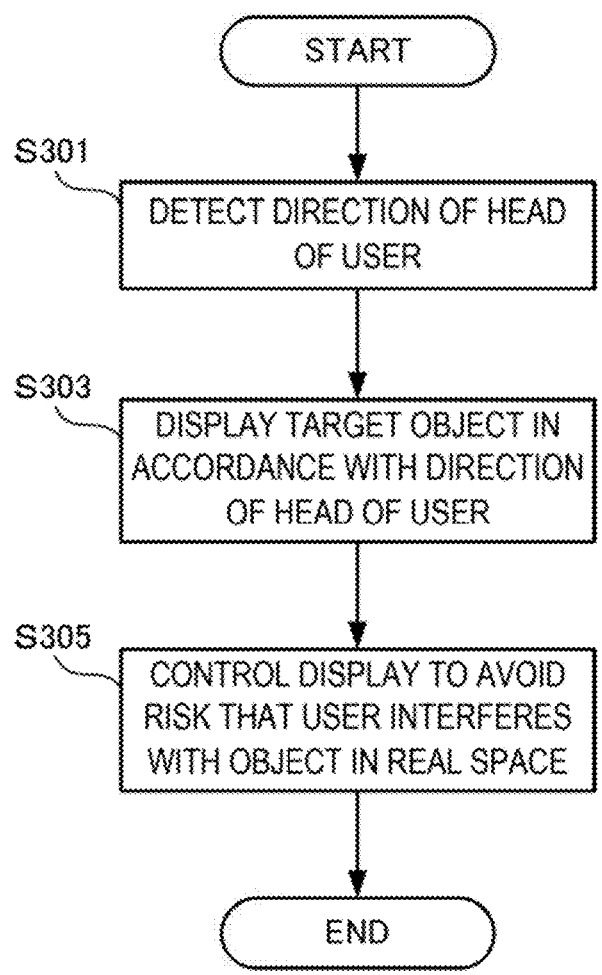
FIG. 3B is a flowchart showing the procedure of processing of the rehabilitation support apparatus according to the second example embodiment of the present invention.

FIG. 3B is a flowchart for explaining the procedure of processing of the rehabilitation support apparatus 210. First, in step S301, the direction of the head of the user 220 wearing the head mounted display 233 is detected. Next, in step S303, the rehabilitation target object 242 to be visually recognized by the user 220 is generated in a virtual space and displayed on the head mounted display 233 in accordance with the direction of the head of the user 220. Further, in step S305, the display controller 212 controls the display to avoid risk that the user 220 interferes with the floor surface 260 that is an object in a real space.

As described above, according to this example embodiment, since the target object 242 is not displayed at a position apart from the floor surface 260 by a predetermined distance or less, it is possible to prevent risk that the user 220 hits the controllers 234 and 235 on the floor surface 260 and gets injured, or falls forward. That is, it is possible to avoid risk to the user during rehabilitation or to his/her circumference.

Third Example Embodiment

Figure 4:
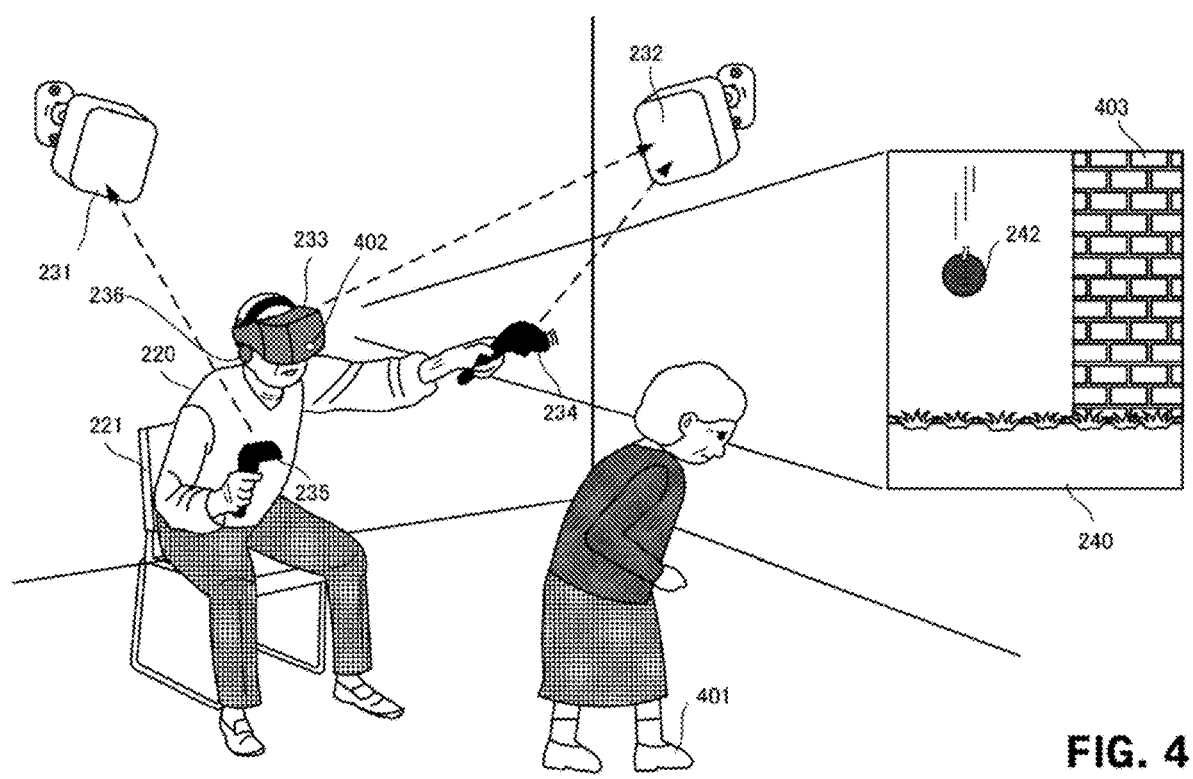
FIG. 4 is a view showing the arrangement of a rehabilitation support apparatus according to the third example embodiment of the present invention.

A rehabilitation support apparatus according to the third example embodiment of the present invention will be described next with reference to FIG. 4. FIG. 4 is a view for explaining the arrangement of the rehabilitation support apparatus according to this example embodiment. The rehabilitation support apparatus according to this example embodiment is different from the above-described second example embodiment in that display is dynamically controlled in accordance with the type, size, and motion of a dynamic obstacle sensed by an obstacle sensor 213. That is, this example embodiment is different in that display is controlled if a person 401 or the like passes by a user 220. The rest of the components and operations is the same as in the second example embodiment. Hence, the same reference numerals denote the same components and operations, and a detailed description thereof will be omitted.

To avoid the person 401 in a real space, a camera 402 provided on the head mounted display 233 is used. It is not limited to the camera 402 if an obstacle can be sensed, and another component (a radar, an ultrasonic sensor, or the like) may be used. Note that the person 401 has been exemplified as an example of a dynamic obstacle, but an animal such as a pet or an insect may be included. In addition, self-sustaining type obstacles such as a home appliance, obstacles such as a curtain, a door, a desk, and a plant, which can generally be classified as static obstacles and can be moved by an external factor such as wind or external stress, and vapor, a water droplet, ice, flame, and the like that are sensed as obstacles are also included in the concept of the present invention.

The display controller 212 does not display a target object 242 in the direction of the person 401 sensed by the camera 402 and the obstacle sensor 213. That is, to avoid risk of hit on the obstacle 401 sensed by the obstacle sensor 213, the display controller 212 displays the target object 242 in a direction other than the direction in which the obstacle 401 exists.

In addition, the display controller 212 displays a wall 403 serving as an obstacle object in the direction of the person 401 sensed by the camera 402 and the obstacle sensor 213, thereby preventing the user from thinking of stretching the hand. The obstacle object is not limited to the wall, and may be an image of a tree or a person. Furthermore, an inhibition notification image (a message by words or symbol) for inhibiting the user from stretching the hand may be displayed, the color of the target object may be changed to, for example, red to notify the user of the risk, or the target object may be changed to another object such as a bomb. Alternatively, in addition to these display control operations, a risk notification using a voice or tactile stimulation by vibration stimulation may be combined.

Also, to avoid risk of hit on the obstacle 401 sensed by the obstacle sensor 213, the display controller 212 may stop display of the target object 242 if the obstacle 401 is sensed. Alternatively, the screen displayed on the head mounted display may temporarily be stopped, the screen display itself may be stopped like blackout, or the motion of the target object may be stopped while keeping the target object displayed.

If the obstacle sensor 213 senses an obstacle, a real space image captured by the camera 402 may directly be displayed on the head mounted display 233.

If the head mounted display 233 is of an optical see-through type, and the obstacle sensor 213 senses an obstacle, control may be performed to change the transmittance of the head mounted display 233 such that the actual obstacle 401 becomes visible. That is, switching from a virtual reality technique VR to an augmented reality technique AR or to a mixed reality technique MR may be done.

In this example embodiment, the obstacle sensor 213 uses the camera 402 of the head mounted display 233. However, the present invention is not limited to this, and another external camera or an external sensor may be used.

As the data of an obstacle object, a special image such as a wall image is preferably prepared in a task set database 216.

The obstacle sensor 213 may perform object recognition using an existing pattern matching technique, and may display an image corresponding to the type of an obstacle. In this case, obstacle objects (a wall, a tree, a rock, and the like) to be displayed are stored in the task set database 216 in correspondence with the types of obstacles (an adult, a child, a pet, and the like).

Fourth Example Embodiment

Figure 5:
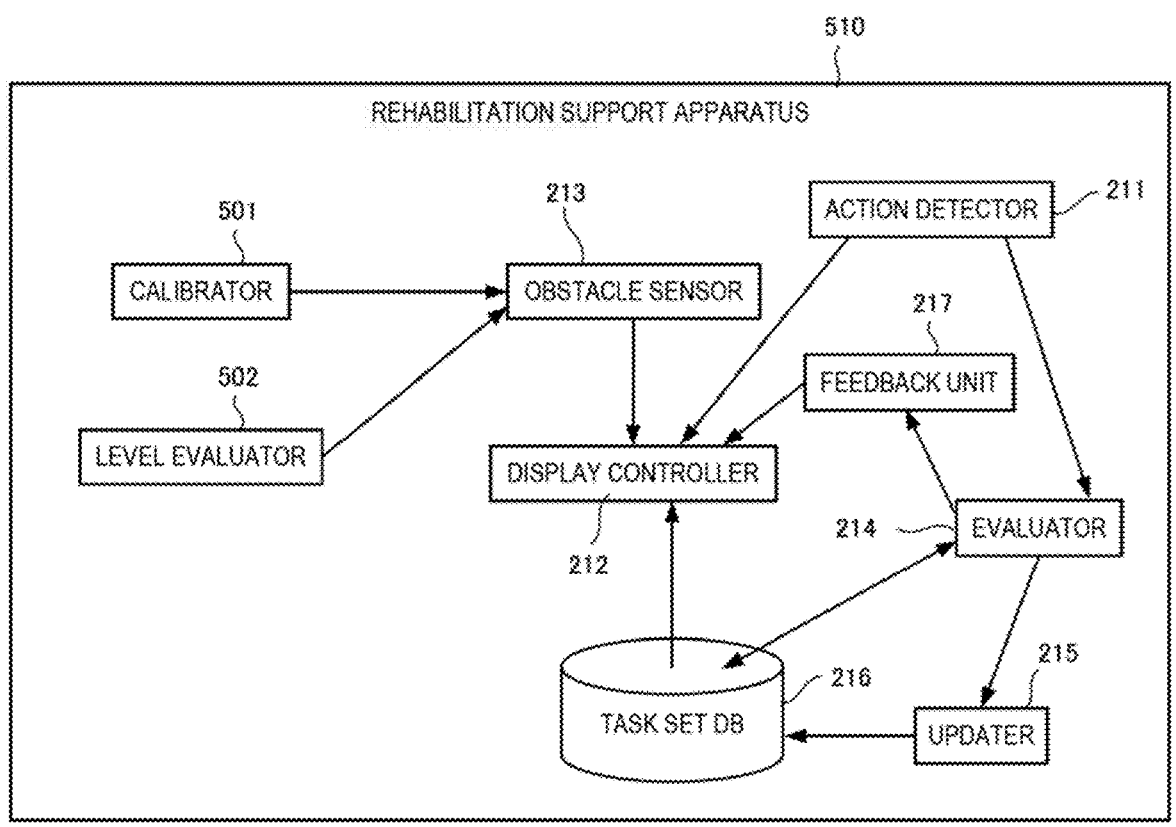
FIG. 5 is a view showing the arrangement of a rehabilitation support apparatus according to the fourth example embodiment of the present invention.

A rehabilitation support apparatus according to the fourth example embodiment of the present invention will be described next with reference to FIG. 5. FIG. 5 is a view for explaining the arrangement of a rehabilitation support apparatus 510 according to this example embodiment. The rehabilitation support apparatus 510 according to this example embodiment is different from the above-described second example embodiment in that the apparatus includes a calibrator 501 and a level evaluator 502. The rest of the components and operations is the same as in the second example embodiment. Hence, the same reference numerals denote the same components and operations, and a detailed description thereof will be omitted.

The calibrator 501 evaluates the action level of a user in advance before rehabilitation. A display controller 212 decides the generation position of the target object based on the evaluation result of the calibrator 501. More specifically, a target action is not made to appear at a position with risk of fall or disease exacerbation in accordance with the action level of each user.

The level evaluator 502 evaluates the action level of the user during rehabilitation. The display controller 212 decides the generation position of the target object based on the evaluation result of the level evaluator 502.

Other Example Embodiments

While the invention has been particularly shown and described with reference to example embodiments thereof, the invention is not limited to these example embodiments.

It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A rehabilitation support apparatus for supporting rehabilitation of a user, comprising:
    a detector that detects a direction of a head of the user wearing a head mounted display;
    a first sensor that senses a position of at least one of a floor surface and a wall surface in the real space around the user, and
    a display controller that generates, in a virtual space, a rehabilitation target object to be visually recognized by the user and displays the target object on the head mounted display in accordance with the direction of the head of the user detected by the detector,
    wherein to avoid risk that the user hits the floor surface or the wall surface in the real space, for the target object that moves toward the floor surface or the wall surface, the display controller makes the target object disappear, stop, or reversely move at a position apart from the floor surface or the wall surface by a predetermined distance.

2. The rehabilitation support apparatus according to claim 1, further comprising a second sensor that senses a position of an obstacle in the real space around the user,
    wherein to avoid risk of hit on the obstacle sensed by the second sensor, the display controller displays the target object in a direction other than a direction of the obstacle.

3. The rehabilitation support apparatus according to claim 1, further comprising a second sensor that senses a position of an obstacle in the real space around the user,
    wherein to avoid risk of hit on the obstacle sensed by the second sensor, the display controller displays an obstacle object or an inhibition notification image in the direction of the obstacle.

4. The rehabilitation support apparatus according to claim 1, further comprising a second sensor that senses a position of an obstacle in the real space around the user,
    wherein to avoid risk of hit on the obstacle sensed by the sensor, if the obstacle is sensed, the display controller stops display of the target object, temporarily stops a screen displayed on the head mounted display, stops screen display itself on the head mounted display, or stops a motion of the target object.

5. The rehabilitation support apparatus according to claim 1, wherein the first sensor is provided on the head mounted display.

6. The rehabilitation support apparatus according to claim 1, further comprising a calibrator that evaluates an action level of the user in advance before rehabilitation,
    wherein the display controller decides a generation position of the target object based on an evaluation result of the calibrator.

7. The rehabilitation support apparatus according to claim 1, further comprising a level evaluator that evaluates the action level of the user during rehabilitation,
    wherein the display controller decides the generation position of the target object based on an evaluation result of the level evaluator.

8. A rehabilitation supporting method for supporting rehabilitation of a user, comprising:
    detecting a direction of a head of the user wearing a head mounted display;
    sensing a position of at least one of a floor surface and a wall surface in the real space around the user, and
    generating, in a virtual space, a rehabilitation target object to be visually recognized by the user and displaying the target object on the head mounted display in accordance with the direction of the head of the user detected in the detecting,
    wherein in the generating, to avoid risk that the user hits the floor surface or the wall surface in the real space, for the target object that moves toward the floor surface or the wall surface, the display controller makes the target object disappear, stop, or reversely move at a position apart from the floor surface or the wall surface by a predetermined distance.

9. A non-transitory computer-readable medium storing a program for causing a computer to execute a rehabilitation supporting method comprising:
    detecting a direction of a head of the user wearing a head mounted display;
    sensing a position of at least one of a floor surface and a wall surface in the real space around the user, and
    generating, in a virtual space, a rehabilitation target object to be visually recognized by the user and displaying the target object on the head mounted display in accordance with the direction of the head of the user detected in the detecting,
    wherein in the generating, to avoid risk that the user hits the floor surface or the wall surface in the real space, for the target object that moves toward the floor surface or the wall surface, the display controller makes the target object disappear, stop, or reversely move at a position apart from the floor surface or the wall surface by a predetermined distance.

* * * * *